(12) United States Patent
Fosbinder

(10) Patent No.: US 7,265,318 B2
(45) Date of Patent: Sep. 4, 2007

(54) SYSTEM AND METHOD FOR VARIABLE HOT START OF A WELDING-TYPE DEVICE

(75) Inventor: Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 459 days.

(21) Appl. No.: 10/710,550

(22) Filed: Jul. 20, 2004

(65) Prior Publication Data

US 2006/0016791 A1    Jan. 26, 2006

(51) Int. Cl.
*B23K 9/06* (2006.01)
(52) U.S. Cl. .................. 219/130.4; 219/130.5
(58) Field of Classification Search ............. 219/130.1, 219/130.4, 130.5, 137 PS
See application file for complete search history.

(56) References Cited

U.S. PATENT DOCUMENTS

| | | | |
|---|---|---|---|
| 3,627,574 A | 12/1971 | Delong et al. | |
| 3,904,846 A | 9/1975 | Risberg | |
| 6,075,225 A | 6/2000 | Heraly et al. | |
| 6,107,602 A | 8/2000 | Geissler et al. | |
| 6,479,794 B1 | 11/2002 | Sykes et al. | |
| 2001/0035399 A1 * | 11/2001 | Geng et al. | 219/121.46 |
| 2002/0079302 A1 | 6/2002 | Hutchison et al. | |

FOREIGN PATENT DOCUMENTS

| | | |
|---|---|---|
| EP | 0784374 A2 | 7/1997 |
| JP | 01107970 A1 | 4/1989 |

* cited by examiner

*Primary Examiner*—Clifford C. Shaw
(74) *Attorney, Agent, or Firm*—Ziolkowski Patent Solutions Group, SC

(57) ABSTRACT

A system and method for a variable hot start of a welding-type device is disclosed. The variable hot start includes determining at least one of a plurality of parameters of a welding-type device including a desired V/A output for a welding-type process. The variable hot start process also includes selecting a startup V/A output greater than the desired V/A output based on the desired V/A output and selecting a duration of a hot start period based on the at least one of the plurality of parameters. A welding-type process is then hot started over the selected duration of the hot start period.

33 Claims, 4 Drawing Sheets

SYSTEM AND METHOD FOR VARIABLE HOT START OF A WELDING-TYPE DEVICE

BACKGROUND OF INVENTION

The present invention relates generally to welding-type apparatus and, more particularly, to a welding-type apparatus configured to deliver a variable hot start. The welding-type device determines a configuration of the welding-type device and a plurality of output parameters, selects a startup welding-type output according to the configuration and output parameters, and dynamically adjusts the startup welding-type output over a hot start period.

One common type of welding-type process is a stick or shielded metal arc welding (SMAW) process. During this process an electrode (stick/rod) comprising a wire core covered with a flux coating is used to deliver a welding arc. For a given SMAW process, it is desirable to control the power supply output to provide a desired voltage/amperage (V/A) curve. Typically, the desired power supply output V/A curve includes a substantially constant current portion within a typical operating voltage range and a "droop" portion where current decreases as voltage increases. Additionally, many welding-type devices provide a "dig" portion where the current increases as voltage decreases for a lower than normal operational voltage range. Thus, it is desirable to provide a power supply that has a constant current portion of the output V/A curve within a typical welding-type voltage range and variable current outputs outside the typical welding-type voltage range.

To initiate an SMAW welding-type process, some welding-type devices provide a "boosted" output, called a hot start. Traditionally, the boosted output includes a fixed amplitude and duration. However, experienced operators typically require less power to initiate an arc than do inexperienced operators. As such, some hot starts could be too "hot" for experienced operators and/or not hot enough for inexperienced operators. If the hot start is too hot, the operator could "blow through" a workpiece. On the other hand, if the hot start is not hot enough, the operator may need to repeatedly attempt to initiate an arc which may mark or scar the workpiece.

Accordingly, modified hot starts have been designed. These systems provide a hot start output similar to the previously described "dig" portion of the V/A output curve. Specifically, if the output voltage drops significantly during the modified hot start period, then an additional boost of current is provided. As such, a voltage drop, such as may occur during a hot start controlled by an inexperienced operator, is responded to with a current increase to initiate an arc. On the other hand, when the voltage remains within a standard range, a constant current is provided until the expiration of the hot start duration.

While such modified hot start systems aid in compensating for variances in operator skill and experience, these hot start systems may still be hampered by operator error. For example, an operator working with an unfamiliar workpiece material, may stray too far into the dig portion of the V/A output curve or remain within the dig portion too long. Accordingly, workpiece "blow through" or scarring may still occur.

Additionally, while such modified hot start systems may compensate for variances in operator skill and experience, these systems do not consider the wide variety of welding-type devices and parameters that may be adjusted. As such, even if operator error does not affect the hot start process, an undesired condition may occur because the hot start process was not adjusted for changes in polarity, electrodes, or other operating parameters.

For example, engine driven welding-type devices may be less responsive than welding-type devices that are powered by static power sources. Accordingly, a hot start process designed for a static power welding-type device may be insufficient for an engine driven welding-type device. Specifically, the duration of the hot start process may necessitate extension in order to adequately start the desired welding-type process. However, by extending the duration of the hot start process, the opportunity for blowthrough, scarring, or other undesirable conditions is also extended.

It would therefore be desirable to have a system and method capable of providing a hot start that would lower the potential for operator error during the hot start period. Additionally, it would advantageous to have a system and method capable of providing a hot start that adjusts to operating parameters of the welding-type device.

BRIEF DESCRIPTION OF INVENTION

The present invention provides a system and method of controlling a startup of a welding-type process that overcomes the aforementioned drawbacks. Specifically, the present invention provides a controller configured to implement a variable hot start. The controller determines a plurality of operating parameters of a welding-type apparatus and controls a hot start period according to the operating parameters.

In accordance with one aspect of the present invention, a method of variable hot start for initiating a welding-type process is disclosed that includes determining at least one of a plurality of parameters of a welding-type device including a desired V/A output for a welding-type process. The method includes selecting a startup V/A output greater than the desired V/A output based on the desired V/A output and selecting a duration of a hot start period based on the at least one of a plurality of parameters. A welding-type process is then hot started over the selected duration of the hot start period.

In accordance with another aspect of the present invention, a computer program is disclosed which causes a processor to determine at least one pre-start condition of a welding-type apparatus including a desired V/A characteristic and select hot start parameters according to the at least one pre-start condition including a taper period based on the desired V/A characteristic. The processor is further caused to select a delivered V/A characteristic above the desired V/A characteristic and start a welding-type process according to the hot start parameters including tapering the delivered V/A characteristic to the desired V/A characteristic over the taper period.

In accordance with yet another aspect of the present invention, a welding-type apparatus is disclosed that includes a power source configured to deliver welding-type power according to a desired welding-type process and a controller configured to control a variable hot start process to initiate the desired welding-type process. The controller is configured to receive an indication of a desired operational V/A output for the desired welding-type process and select a startup V/A output greater than the desired V/A output at least based on the desired operational V/A output and select a hot start period at least based on the desired operational V/A output. The controller is also configured to deliver the startup V/A output to initiate the desired welding-type process and reduce the startup V/A output to the desired operational V/A output over the hot start period.

In accordance with yet another aspect of the present invention, a welding-type apparatus is disclosed that includes means for determining a user selected V/A output for a desired welding-type process and means for boosting a starting V/A output above the user selected V/A output. The welding-type apparatus also includes means for selecting a time period based upon the user selected V/A output and means for delivering a variable hot start by providing the starting V/A output to an output of the welding-type apparatus and then reducing the starting V/A output to the user selected V/A output over the time period.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a system and method for a variable hot start of a welding-type process. A control is configured to implement the variable hot start by determining a plurality of operating parameters of a welding-type apparatus and controlling a hot start period according to the operating parameters.

As one skilled in the art will fully appreciate, the heretofore description of welding apparatus not only includes welders, but also includes any system that requires high power outputs, such as heating and cutting systems. Therefore, the present invention is equivalently applicable with welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems, and any similar systems.

Figure 1:
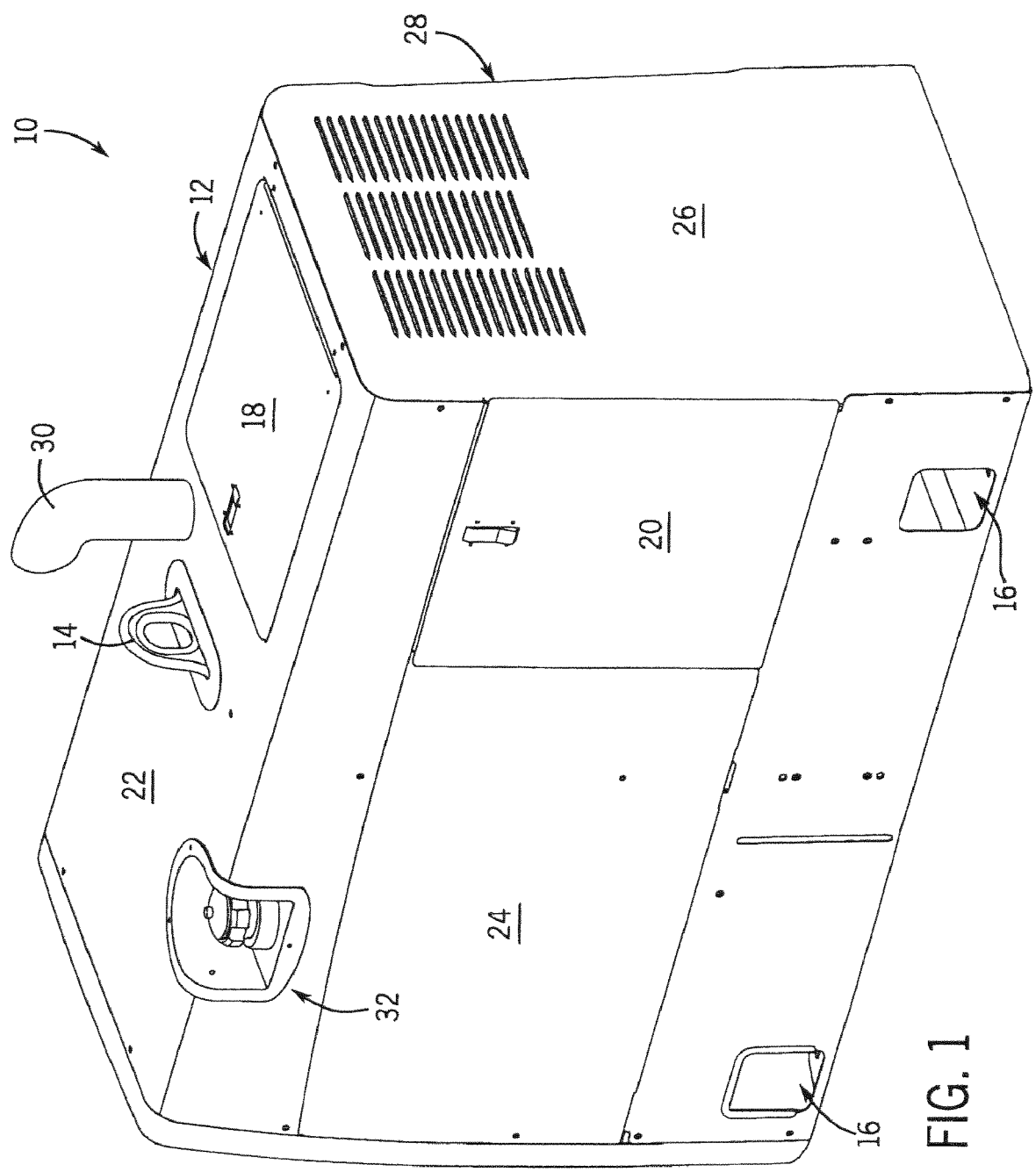
FIG. 1 is a perspective view of an engine driven welding-type apparatus incorporating the present invention.

FIG. 1 shows a welding-type device 10. The welding-type device 10 includes a housing 12 which encloses its internal components. Optionally, the welding-type device 10 includes a loading eyehook 14 and/or fork recesses 16. The loading eyehook 14 and the fork recesses 16 facilitate the portability of the welding-type device 10. Optionally, the welding-type device 10 could include a handle and/or wheels as a means of device mobility. The housing 12 also includes a plurality of access panels 18, 20. Access panel 18 is hinged to side panel 24 while access panel 20 is, in one embodiment, hinged to top panel 22. A similar access panel is available on an opposite side of the welding-type device 10. These access panels 18, 20, provide access to the internal components of the welding-type device. An end panel 26 includes a louvered opening 28 to allow for air flow through the housing 12.

The housing 12 of the welding-type device 10 also houses an internal combustion engine. In this regard, an exhaust port 30 extends through top panel 22 and a fuel port 32 extends through an intersection of top panel 22 and side panel 24. The exhaust port 30 extends above the top panel 22 of the housing 12 and directs exhaust emissions away from the welding-type device 10. The fuel port 32 preferably does not extend beyond the top panel 22 or side panel 24. Such a construction protects the fuel port 32 from damage during transportation and operation of the welding-type device 10.

Figure 2:
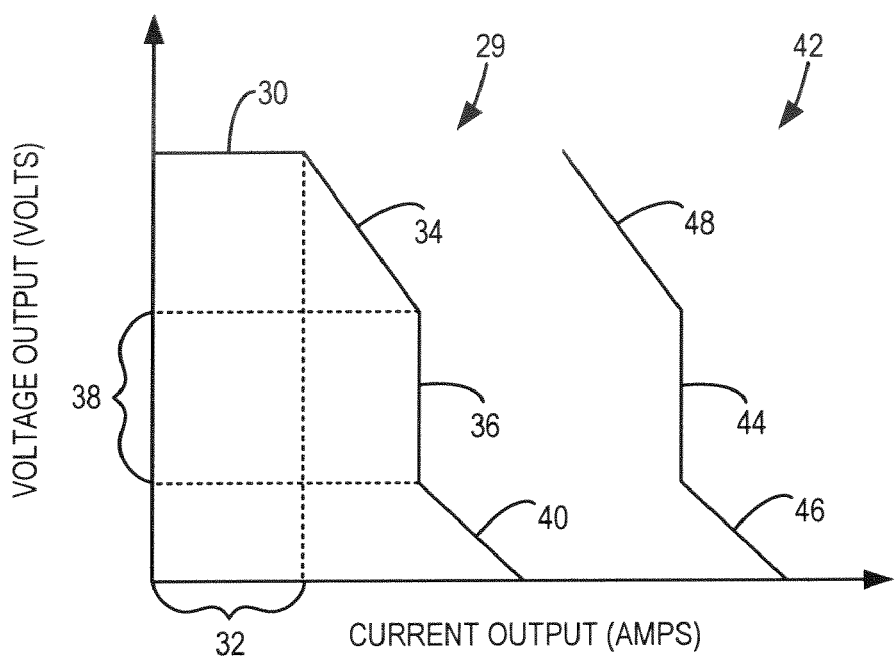
FIG. 2 is a graph illustrating a V/A output curve of the welding-type apparatus of FIG. 1 in accordance with the present invention.

Referring to FIG. 2, an operational output V/A curve 29 of a welding-type device, such as illustrated in FIG. 1, is shown. The curve shown in FIG. 2 is the operational V/A curve 29 for a desired welding-type process. As may be seen, a flat or constant voltage (CV) portion 30 of the V/A curve 29 is provided at low amperage 32. Also, a "droop" or sloped portion 34 of the V/A curve is provided between the CV and a constant current (CC) portion 36 of the curve 29. The CC portion 36 occurs over the voltages typically found under welding conditions 38. Thus, when the welder is operating under normal welding conditions, the welding-type apparatus behaves as a CC power supply. Finally, the output V/A curve 29 includes a "dig" portion 40 where the current increases with decreasing voltage.

A controller is included that allows a variable hot start to be used. In accordance with one aspect of the variable hot start, the controller boosts the traditional operational V/A curve 29 to a hot start V/A curve 42 to deliver the boosted hot start output. While standard hot starts may simply include a CC portion 44 of the boosted V/A curve 42 during the hot start, the variable hot start may include a dig portion 46 and a droop portion 48 as well, in a manner similar to a modified hot start.

However, while traditional hot start systems and modified hot start systems move directly from the boosted V/A curve 42 to the operational V/A curve 29, the present invention includes a taper period that is automatically selected according to the specific configuration and operational parameters of an individual welding-type device. Specifically, as will be described with respect to FIGS. 3 and 4, a controller is configured to review a plurality of parameters of the welding-type device and adjust a taper period of the hot start accordingly.

Furthermore, while traditional hot start systems and modified hot start systems typically include a predetermined shift between the operational V/A curve 29 and the hot start curve 42, the present invention includes a controller configured to dynamically select the shift or boost of the hot start V/A curve 42 according to the specific operational configuration of the welding-type device, as will be described.

Figure 3:
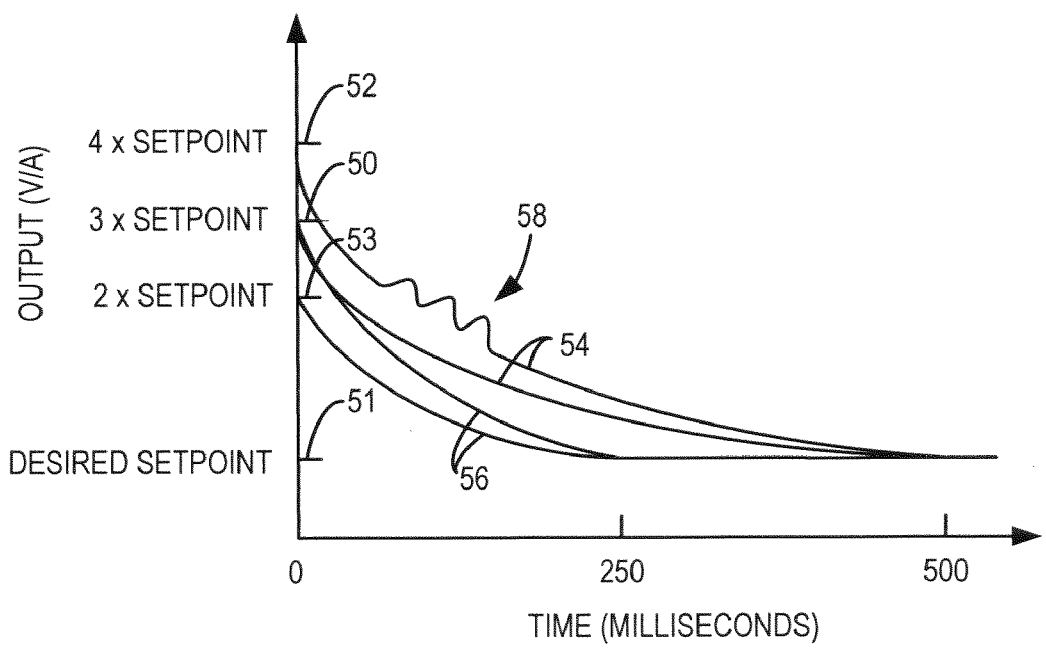
FIG. 3 is a graph illustrating a V/A output curve during a variable hot start period of the welding-type apparatus of FIG. 1 in accordance with the present invention.

The resulting variable hot start curve, as a function of time, is shown in FIG. 3. In accordance with a preferred embodiment, the variable hot start process setpoint 50 is a boosted current of approximately three times the desired or operator selected setpoint output current 51. However, a wide variety of boosted current start points are contemplated.

For example, the specific start point may be increased or decreased according to the currently engaged electrode. That is, the variable hot start setpoint may be automatically selected based on the specific electrode currently engaged with the welding-type device. For example, while a default variable hot start setpoint may be three times the desired setpoint 50, when an electrode with an increased diameter is engaged with the welding-type device, the controller may automatically increase the variable hot start setpoint to be four times the desired setpoint 52. Similarly, should an electrode having a decreased diameter be detected, the controller may automatically reduce the variable hot start setpoint to be twice the desired setpoint 53.

From the selected variable hot start setpoint 50, 52, 53, the controller is configured to taper the output current over a taper period. The controller gradually reduces the current from the initially selected variable hot start set point 50, 52, 53 to the original operator setpoint 51 for the desired current output. In accordance with a preferred embodiment, at least two taper period durations and corresponding curves are contemplated. Specifically, a high output taper period giving rise to high output slopes 54 and a lower output taper period giving rise to low output slopes 56 are shown. While two taper periods resulting in two output slopes are shown, it is contemplated that numerous taper periods and corresponding slopes may be used.

In accordance with a preferred embodiment of the invention, the high output slopes 54 correspond to a taper period of approximately 500 milliseconds (ms) and the low output slopes 56 correspond to a taper period of approximately 250 ms. As can be seen in FIG. 3, at the exhaustion of each taper period, the output current has completed the transition from the initial variable host start setpoint 50, 52, 53 to the desired setpoint 51.

Additionally, it is contemplated that the tapered hot start slopes 54, 56 may be combined with modified-type hot starts such that the current is also responsive to the control of the operator. As such, operators that are generally more skilled at initiating the welding process, are able to quickly initiate a desired output such that less time is spent in the dig portion 46 of FIG. 2. As such, the output curves 54, 56 may include spikes and valleys 58 corresponding to increases or decreases caused by increasing and decreasing dig current. On the other hand, an operator who does initiate the arc immediately may receive increased current giving rise to a larger spikes within the tapered hot start slopes 54, 56. However, unlike traditional modified hot starts, this spikes or valleys 58 are gradually reduced due to the taper. Therefore, operators are provided with sufficient current to initiate and maintain an arc but the overall output is controlled and continually reduced such that marking, scarring, or blow though of the workpiece is avoided.

Figure 4:
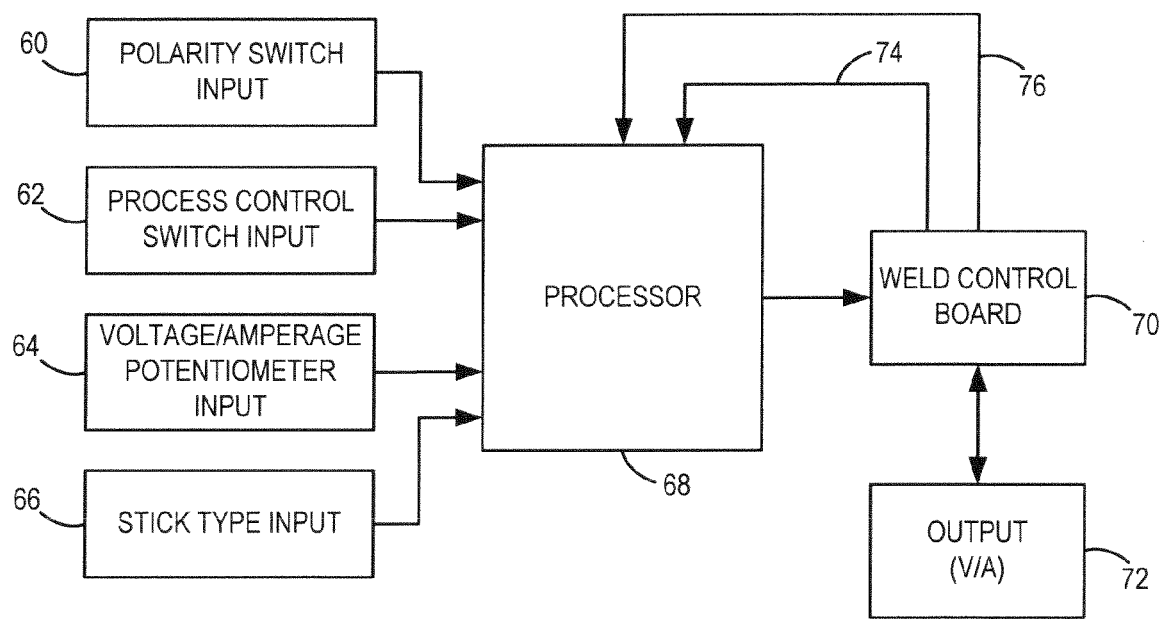
FIG. 4 is a schematic of an architecture for implementing a variable hot start technique in accordance with the present invention.

Referring now to FIG. 4, an architecture for implementing a variable hot start technique in accordance with the present invention is shown. The system includes a plurality of inputs, including a polarity switch input 60, a process control switch input 62, a voltage/amperage potentiometer input 64, and a stick-type input 66. The system also includes a processor 68, a weld board control 70, and an output 72. Each of the inputs 60–66 is configured to deliver feedback to the processor 68. As will be described with respect to FIG. 5, the processor 68 reviews the feedback and determines a plurality of variable hot start output parameters which are then communicated to the weld control board 70 which, in turn, effectuates a variable hot start according to the variable hot start parameters via the output 72. A current feedback loop 74 and a voltage feedback loop 76 are included such that feedback from the output 72 to the weld control board 70 can be communicated to the processor 68 in order to implement modified-type hot start capabilities along with the variable hot start, as previously described with respect to FIG. 3. Accordingly, a system architecture is achieved to implement a variable hot start process and optional modified hot start combination.

Figure 5:
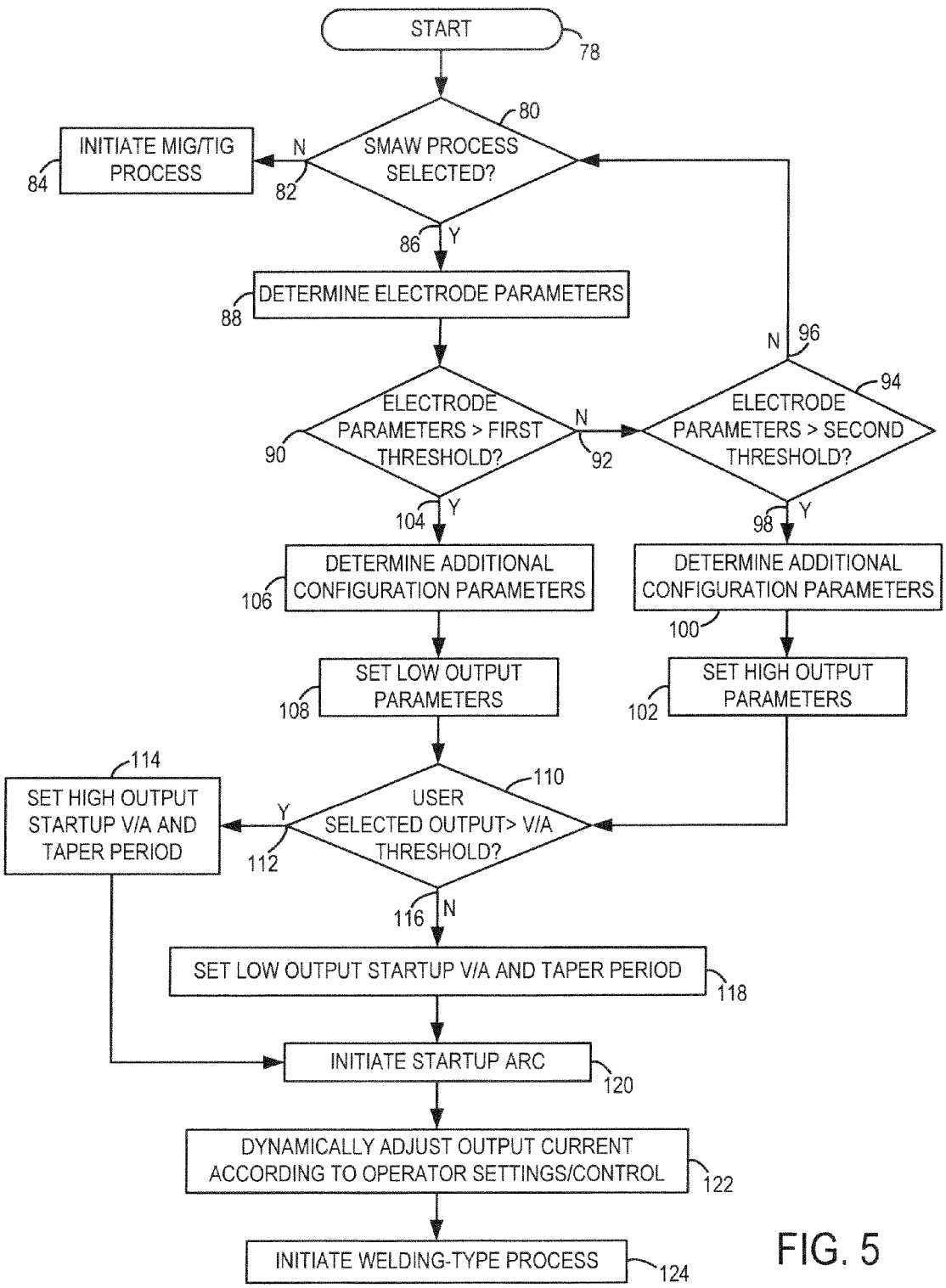
FIG. 5 is a flow chart setting forth the steps of a variable hot start technique in accordance with the present invention.

Regarding FIG. 5, a flow chart illustrating the steps of the technique for a variable hot start process, in accordance with the present invention, is shown. The technique starts 78 by determining whether the currently selected welding-type process is an SMAW process 80. If the currently selected process is not an SMAW process 82, the variable hot start technique is bypassed to initiate a MIG or TIG process 84. On the other hand, if the currently selected welding-type process is an SMAW process 86, the currently selected electrode is checked to determine the electrode size and configuration 88. The electrode parameters determined 88 are then compared to a first threshold to determine whether the electrode parameters are greater than the first threshold 90. In accordance with a preferred embodiment, the first threshold is selected so as to determine whether the currently engaged electrode is an XX10-type electrode. However, it is contemplated that the first threshold may be selected so as to determine any particular size or configuration of the currently engaged electrode.

If the electrode parameters are not greater than the first threshold 92, then the electrode parameters are compared to a second threshold to determine whether the electrode parameters are greater than the second threshold 94. In accordance with a preferred embodiment, the second threshold is selected so as to determine whether the currently engaged electrode is a XX18-type electrode. However, it is contemplated that the second threshold may be selected so as to determine any electrode size and configuration. If the electrode is not greater than the second threshold 96, then it has been determined that the currently engaged electrode is not an electrode supported for an SMAW process by the welding-type device and a reconfirmation of whether the selected process is an SMAW process is performed 80. While the illustrated embodiment shows a first and a second threshold comparison 90, 94, it is contemplated that any number of comparisons may be made such that parsings between electrode parameters may be intricately configured to tailor the variable hot start process to the specific electrode currently engaged. That is, while the illustrated embodiment shows a first and a second threshold 90, 94, in order to discern between XX10-type electrodes and XX18-type electrodes, it is contemplated that additional thresholds or determinations may be made so as to distinguish further between electrode types.

If the electrode parameters are greater than the second threshold 98, the technique continues by determining additional configuration parameters 100, such as the selected polarity. From the determination of the electrode 98 and the determination of any additional configuration parameters 100, high output parameters for the variable hot start are set 102. For example, as described with respect to FIG. 3, the initial setpoint may be adjusted according to the configuration of the welding-type device.

Referring back to FIG. 5 and the determination of whether the electrode parameters are greater than a first threshold 90, should the electrode parameters be greater than the first threshold 104, additional configuration parameters are determined 106. For example, it is contemplated, that the additional configuration parameters considered may include the selected polarity for the welding-type process. Utilizing the identified electrode type 104 and any additional configuration parameters 106, low output parameters for the variable hot start are set 108.

Once the output parameters are set 102/108, a determination is made as to whether the user selected output is greater than a V/A threshold 110. In accordance with a preferred embodiment, the V/A threshold is selected to be ⅓ of maximum V/A, which in some applications is roughly 100 V/A. Should the user selected output be greater than the V/A threshold 112, a high output startup V/A and high taper period are set 114. On the other hand, should the user selected output not be greater than the V/A threshold 116, a low output startup V/A and low taper period are set 118.

After the output startup V/A and corresponding taper period are set 114/118, a startup arc is initiated 120. Once the arc is initiated and during the taper period, the output current is dynamically adjusted according to operator settings/control 122. Specifically, it is contemplated that the variable hot start be dynamically adjusted to implement a combination variable hot start/modified hot start. This continues across the duration of the taper period. The technique concludes at the exhaustion of the taper period and the corresponding initiation of a welding-type process 124.

Therefore, the present invention includes a method of variable hot start for initiating a welding-type process that includes determining at least one of a plurality of parameters of a welding-type device including a desired V/A output for a welding-type process. The method includes selecting a startup V/A output greater than the desired V/A output based on the desired V/A output and selecting a duration of a hot start period based on the at least one of a plurality of parameters. The welding-type process is then hot started for the selected duration of the hot start period.

In another embodiment of the present invention, a computer program causes a processor to determine at least one pre-start condition of a welding-type apparatus including a desired V/A characteristic and select hot start parameters according to the at least one pre-start condition including a taper period based on the desired V/A characteristic. The processor is further caused to select a delivered V/A characteristic above the desired V/A characteristic and start a welding-type process according to the hot start parameters including tapering the delivered V/A characteristic to the desired V/A characteristic over the taper period.

An alternate embodiment of the present invention has a welding-type apparatus that includes a power source configured to deliver welding-type power according to a desired welding-type process and a controller configured to control a variable hot start process to initiate the desired welding-type process. The controller is configured to receive an indication of a desired operational V/A output for the desired welding-type process and select a startup V/A output greater than the desired V/A output at least based on the desired operational V/A output and select a hot start period at least based on the desired operational V/A output. The controller is also configured to deliver the startup V/A output to initiate the desired welding-type process and reduce the startup V/A output to the desired operational V/A output over the hot start period.

In another embodiment of the present invention, a welding-type apparatus includes means for determining a user selected V/A output for a desired welding-type process and means for boosting a starting V/A output above the user selected V/A output. The welding-type apparatus also includes means for selecting a time period based upon the user selected V/A output and means for delivering a variable hot start by providing the starting V/A output to an output of the welding-type apparatus and then reducing the starting V/A output to the user selected V/A output over the time period.

The present invention has been described in terms of the preferred embodiment, and it is recognized that equivalents, alternatives, and modifications, aside from those expressly stated, are possible and within the scope of the appending claims.

What is claimed is:

1. A method of variable hot start for initiating a welding-type process comprising the steps of:
    determining at least one of a plurality of parameters of a welding-type device including a desired voltage/amperage (V/A) output for a welding-type process;
    selecting a startup V/A output greater than the desired V/A output based on the desired V/A output;
    selecting a duration of a hot start period based on the at least one of a plurality of parameters; and
    hot starting the welding-type process over the selected duration of the hot start period.

2. The method of claim 1 further comprising the steps of selecting a taper period based on the at least one of a plurality of parameters and tapering the startup V/A output to the desired V/A output over the taper period.

3. The method of claim 2 further comprising the steps of selecting the taper period to be substantially equivalent to the selected duration of the hot start period.

4. The method of claim 2 further comprising the steps of selecting the taper period based on the desired V/A output.

5. The method of claim 4 further comprising the step of selecting the taper period to be approximately 250 milliseconds (ms) if the desired V/A output is substantially less than approximately ⅓ of maximum V/A.

6. The method of claim 4 further comprising the step of selecting the taper period to be approximately 500 ms if the desired V/A output is substantially greater than approximately ⅓ of maximum V/A.

7. The method of claim 1 further comprising the step of selecting the startup V/A to be approximately three times the desired V/A output.

8. The method of claim 1 further comprising the steps of determining a selected stick type and adjusting the startup V/A output according to the selected stick type.

9. The method of claim 8 further comprising the step of setting the startup V/A output to be greater than the desired V/A output by approximately 300% if the selected stick-type is XX10.

10. The method of claim 8 further comprising the step of setting the startup V/A output to be greater than the desired V/A output by approximately 300% if the selected stick-type is XX18.

11. The method of claim 1 wherein the welding-type process includes a stick welding-type process.

12. The method of claim 1 further comprising the step of determining at least one of desired output polarity, desired process output, desired voltage output, desired amperage output, and electrode type and adjusting the startup V/A output according to the at least one pre-start condition.

13. The method of claim 1 further comprising the step of receiving feedback regarding a variable startup process and dynamically adjusting the startup V/A output.

14. A computer readable storage medium having stored thereon a computer program comprising instructions which, when executed by at least one processor, cause the at least one processor to:
    determine at least one pre-start condition of a welding-type apparatus including a desired V/A characteristic;

select hot start parameters according to the at least one pre-start condition including a taper period based on the desired V/A characteristic;

select a delivered V/A characteristic above the desired V/A characteristic; and start a welding-type process according to the hot start parameters including tapering the delivered V/A characteristic to the desired V/A characteristic over the taper period.

15. The computer program of claim 14 wherein the processor is further caused to select the delivered V/A characteristic to be approximately three times the desired V/A characteristic and select the taper period to be approximately 250 milliseconds (ms) if the desired V/A characteristic is below approximately 1/3 of maximum V/A.

16. The computer program of claim 14 wherein the processor is further caused to select the delivered V/A characteristic to be approximately three times the desired V/A characteristic and select the taper period to be approximately 500 milliseconds (ms) if the desired V/A characteristic is above approximately 1/3 of maximum V/A.

17. The computer program of claim 14 wherein the processor is further caused to receive feedback regarding the step of starting the welding-type process and dynamically adjust the hot start parameters.

18. The computer program of claim 14 wherein the processor is further caused to determine at least one of desired output polarity, desired process output, desired voltage output, desired amperage output, and electrode type to determine the at least one pre-start condition.

19. The computer program of claim 14 wherein the processor is further caused to control an arc start amperage, an arc start voltage, and an arc start duration according to the hot start parameters to start the welding-type process.

20. The computer program of claim 14 wherein the processor is further caused to determine at least one electrode parameter and set the delivered V/A characteristic according to the at least one electrode parameter.

21. The computer program of claim 20 wherein the processor is further caused to increase the delivered V/A characteristic by approximately 300% if the at least one electrode parameter is XX10.

22. The computer program of claim 20 wherein the processor is further caused to increase the delivered V/A characteristic by approximately 300% if the at least one electrode parameter is XX18.

23. A welding-type apparatus comprising:
a power source configured to deliver welding-type power according to a desired welding-type process; and
a controller configured to control a variable hot start process to initiate the desired welding-type process, wherein the controller is configured to:
receive an indication of a desired operational V/A output for the desired welding-type process;
select a startup V/A output greater than the desired V/A output at least based on the desired operational V/A output;
select a hot start period at least based on the desired operational V/A output;
deliver the startup V/A output to initiate the desired welding-type process; and
reduce the startup V/A output to the desired operational V/A output over the hot start period.

24. The apparatus of claim 23 wherein the controller is further configured to select the startup V/A output to be approximately three times the desired operational V/A output.

25. The apparatus of claim 23 wherein the controller is further configured to select a taper period and taper the startup V/A output to reduce the startup V/A to the operational V/A output over the taper period.

26. The apparatus of claim 25 wherein the controller is further configured to select the taper period to be approximately 500 ms if the operational V/A output is greater than approximately 1/3 of maximum V/A.

27. The apparatus of claim 25 wherein the controller is further configured to select the taper period to be approximately 250 ms if the operational V/A output is less than approximately 1/3 of maximum V/A.

28. The apparatus of claim 23 wherein the controller is further configured to determine a selected stick type and adjust the startup V/A output according to the selected stick type.

29. A welding-type apparatus comprising:
means for determining a user selected V/A output for a desired welding-type process;
means for boosting a starting V/A output above the user selected V/A output;
means for selecting a time period based upon the user selected V/A output; and
means for delivering a variable hot start by providing the starting V/A output to an output of the welding-type apparatus and then reducing the starting V/A output to the user selected V/A output over the time period.

30. The welding-type apparatus of claim 29 wherein the starting V/A output is approximately three times the user selected V/A output and the time period is approximately 250 milliseconds (ms) if the user selected V/A output is below approximately 1/3 of maximum V/A.

31. The welding-type apparatus of claim 29 wherein the starting V/A output is approximately three times the user selected V/A output and the time period is approximately 500 milliseconds (ms) if the user selected V/A output is above approximately 1/3 of maximum V/A.

32. The welding-type apparatus of claim 29 further comprising means for adjusting the starting V/A output according to a selected welding-type electrode.

33. The welding-type apparatus of claim 29 further comprising means for dynamically adjusting the starting V/A output and the user selected V/A output according to user input during the time period.

* * * * *